US012100079B2

(12) United States Patent
Suetsugu

(10) Patent No.: US 12,100,079 B2
(45) Date of Patent: Sep. 24, 2024

(54) SYSTEM AND COMPUTER PROGRAM PRODUCT FOR PRESENTATION OF COMBINED PRODUCT IMAGE WITH PRODUCT ACCOMPANIMENT IMAGE

(71) Applicant: Katsunori Suetsugu, Tokyo (JP)

(72) Inventor: Katsunori Suetsugu, Tokyo (JP)

( * ) Notice: Subject to any disclaimer, the term of this patent is extended or adjusted under 35 U.S.C. 154(b) by 79 days.

(21) Appl. No.: 17/701,006

(22) Filed: Mar. 22, 2022

(65) Prior Publication Data

US 2022/0343570 A1 Oct. 27, 2022

(30) Foreign Application Priority Data

Apr. 22, 2021 (JP) .................................... 2021-72671

(51) Int. Cl.
*G06T 11/60* (2006.01)
*G06T 5/70* (2024.01)
*G06T 7/90* (2017.01)

(52) U.S. Cl.
CPC ............... *G06T 11/60* (2013.01); *G06T 5/70* (2024.01); *G06T 7/90* (2017.01); *G06T 2207/10024* (2013.01); *G06T 2207/20221* (2013.01)

(58) Field of Classification Search
CPC . G06T 5/002; G06T 7/90; G06T 11/60; G06T 2207/10024; G06T 2207/20221
USPC ........................................................ 345/419
See application file for complete search history.

(56) References Cited

U.S. PATENT DOCUMENTS

2019/0050427 A1* 2/2019 Wiesel .................... G06T 19/00

FOREIGN PATENT DOCUMENTS

| JP | H10207941 A | 8/1998 | |
| JP | 2003125289 A | 4/2003 | |
| JP | 2003263632 A | 9/2003 | |
| WO | WO-2015172247 A1 * | 11/2015 | ............. G06Q 10/06 |

OTHER PUBLICATIONS

Liu et al., Comparing VR-and AR-Based Try-On Systems Using Personalized Avatars, Human Computer Interaction and Its Future, Nov. 2020, pp. 1-25 (including cover).*
Official Action Issued By Foreign Patent Office in Application No. 2021-072671.

* cited by examiner

*Primary Examiner* — Jacinta M Crawford
(74) *Attorney, Agent, or Firm* — Rosenberg, Klein & Lee

(57) ABSTRACT

Provided is a combined image presentation system and computer program product that are able to combine and present an image for helping a user purchase a product matching a use scene. The combined image presentation system includes a scene processed image generator that generates a scene processed image by performing processing on a scene image stored in a scene storage unit, a main image generator that generates a main image representing a state in which a product is decorated with or displayed on a product accompaniment by combining an product image and a product accompaniment image selected by a user, an image combination unit that generates a combined image by combining the scene image or scene processed image as the background of the main image, and a combined image presentation unit that presents the combined image generated by the image combination unit to the user.

4 Claims, 3 Drawing Sheets

SYSTEM AND COMPUTER PROGRAM PRODUCT FOR PRESENTATION OF COMBINED PRODUCT IMAGE WITH PRODUCT ACCOMPANIMENT IMAGE

TECHNICAL FIELD

The present invention relates to a combined image presentation system and computer program product that combine any image with a product image and present the combined image. More specifically, the present invention relates to a combined image presentation system and computer program product that combine, with a product image, a product accompaniment image and/or a scene image serving as a background that help a user purchase a product and present the combined image.

BACKGROUND ART

Users have had a need to check whether clothes fit their body shape without actually trying on the clothes when purchasing the clothes at a real store or an EC site on the Internet. Users also have had a need to check whether they are wearing clothes well by checking a state in which the users trying on the clothes are taking various poses, from the front, rear, left, and right.

To satisfy these needs, technologies have existed that display a three-dimensional image of a mannequin on a user terminal and/or a display or the like installed in a real store as if a user were wearing clothes (for example, see Japanese Unexamined Patent Application Publication No. 2002-183542). Showing the mannequin as if the mannequin were the user allows the user to grasp a state in which the user is wearing the clothes and to check to what extent the user and clothes match each other and helps the user purchase the clothes.

However, even if the user is allowed to check to what extent the user and clothes match each other, the user is not allowed to check what scene the user wearing the clothes matches. For this reason, clothes purchased by the user may not match a scene in which the user mainly uses the clothes. This applies to not only clothes but also products such as home appliances, and users have had a need to use imagination to purchase a product that matches a use scene. For this reason, there has been a need to display, as the background of a product, an image that allows a user to check at least the atmosphere of a use scene.

As related art, Japanese Unexamined Patent Application Publication No. Hei 10-207941 describes a product information presentation apparatus for network shopping that when a customer selects clothes as products, displays an image in which a mannequin wearing the products is combined with a town image and that when the customer selects a scene selection button to change the scene to another, combines the selected products and an image serving as a background and allows the customer to check the combined image.

Japanese Unexamined Patent Application Publication No. 2003-263632 describes a virtual try-on display apparatus that stores image data of clothes and image data of a human body that tries on clothes, such as a mannequin.

Japanese Unexamined Patent Application Publication No. 2003-125289 describes an image combination apparatus that allows an operator to select an image where an image as a main subject image is included and a background image and to use a parameter setting button so that a background image blurring process, a density conversion process, or a contrast adjustment process is performed.

See Japanese Unexamined Patent Application Publication Nos. 2002-183542, Hei 10-207941, 2003-263632, and 2003-125289.

SUMMARY OF INVENTION

An object of the present invention is to provide a combined image presentation system and computer program product that are able to combine and present an image for helping a user purchase a product matching a use scene.

To accomplish the above object, one aspect of the present invention provides a combined image presentation system. The combined image presentation system includes a product storage unit that stores a product image representing a product, a product accompaniment storage unit that stores a product accompaniment image representing a product accompaniment for decorating or displaying the product, a scene storage unit that stores scene images representing scenes, a scene processed image generator that generates a scene processed image by performing processing on a scene image stored in the scene storage unit, a main image generator that generates a main image representing a state in which the product is decorated with or displayed on the product accompaniment by combining the product image and the product accompaniment image selected by a user, an image combination unit that generates a combined image by combining the scene image or the scene combined image as a background of the main image, and a combined image presentation unit that presents the combined image generated by the image combination unit to the user.

The combined image presentation system according to the one aspect of the present invention generates the combined image by combining the scene image or scene processed image as the background of the main image and presents the combined image to the user. Thus, the combined image presentation system allows the user to check the scene in which the product may be used and helps the user purchase a product matching the use scene.

In the one aspect of the present invention, the scene processed image generator may generate the scene processed image by performing an abstraction process so that an area specified by the user of the scene image is blurred at an abstraction level specified by the user.

According to the one aspect of the present invention, at least one area of the scene image can be blurred at the specified abstraction level.

In the one aspect of the present invention, the image combination unit may determine a scene image matching the main image with a degree specified by the user and may combine, as a background of the main image, the determined scene image or a scene processed image obtained by processing the scene image using the scene processed image generator.

According to the one aspect of the present invention, the scene image or scene processed image matching the product with the degree desired by the user can be generated as the background of the main image, and the user can check the desired combined image.

The combined image presentation system according to the one aspect of the present invention may further include a color evaluation unit that makes an evaluation of a color-related index between the product image, the product accompaniment image, and the scene image or the scene processed image presented by the combined image presentation unit and a color evaluation presentation unit that presents the evaluation made by the color evaluation unit to the user.

According to the one aspect of the present invention, the user can check whether each image matches the product in terms of color by checking the evaluation.

Another aspect of the present invention provides a computer program product for causing a computer to function as product storage means configured to store a product image representing a product, product accompaniment storage means configured to store a product accompaniment image representing a product accompaniment for decorating or displaying the product, scene storage means configured to store scene images representing scenes, scene processed image generation means configured to generate a scene processed image by performing processing on a scene image stored in the scene storage means, main image generation means configured to generate a main image representing a state in which the product is decorated with or displayed on the product accompaniment by combining the product image and the product accompaniment image selected by a user, image combination means configured to generate a combined image by combining the scene image or the scene combined image as a background of the main image, and combined image presentation means configured to present the combined image generated by the image combination means to the user.

According to the other aspect of the present invention, the combined image is generated by combining the scene image or scene processed image as the background of the main image, and the generated combined image is presented to the user. Thus, the user can check the scene in which the product may be used and can be helped to purchase a product matching the use scene.

DESCRIPTION OF EMBODIMENTS

Now, an embodiment of the present invention will be described in detail with reference to the drawings.

Figure 1:
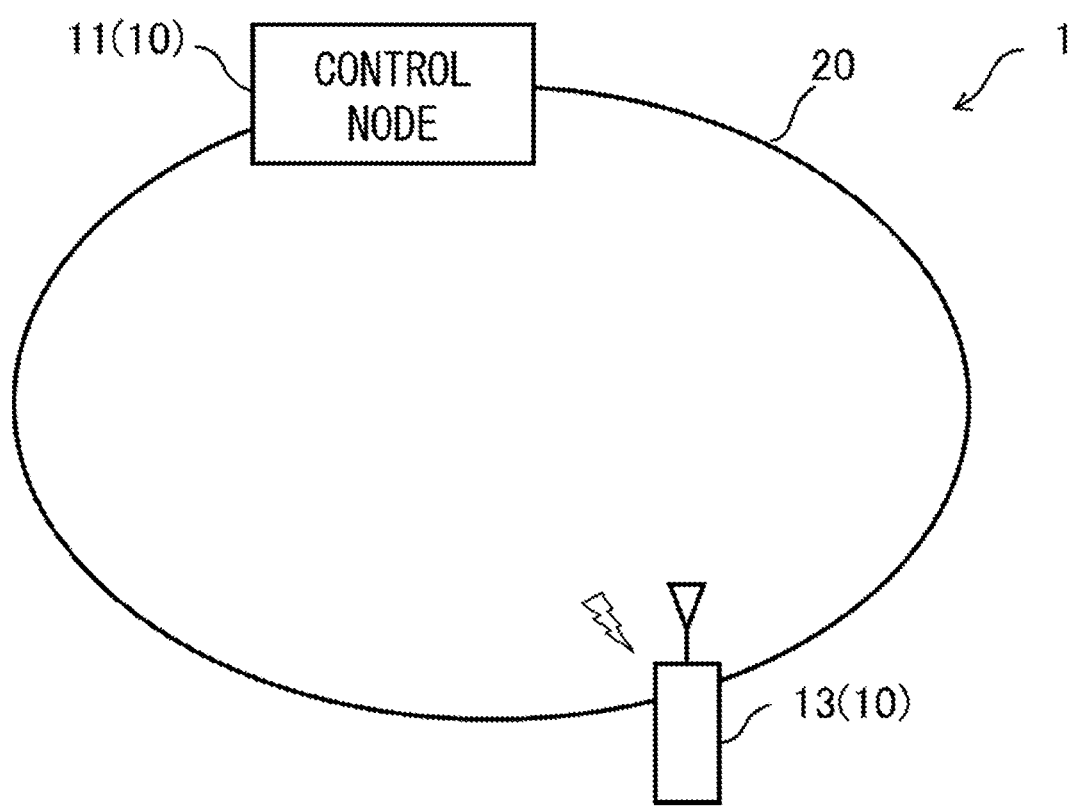
FIG. 1 is a diagram showing the overall configuration of a combined image presentation system according to an embodiment of the present invention.

FIG. 1 is a diagram showing the overall configuration of a combined image presentation system 1 according to the embodiment of the present invention. As shown in FIG. 1, the combined image presentation system 1 includes multiple nodes 10 forming a blockchain network 20. The nodes 10 include a control node 11 that controls the entire combined image presentation system 1 and a user terminal 13 owned by a user and are configured to be able to communicate with each other through the blockchain network 20. The user terminal 13 is, for example, a communication terminal such as a personal computer or portable information terminal.

The control node 11 is a computer having a communication function and includes, as hardware, a CPU, a storage device including RAM, ROM, and hard disk, a communication interface that controls communication through the blockchain network 20, and input/output interfaces such as a keyboard and a display. Various types of data and software such as programs are stored in the storage device of the control node 11. Examples of the data stored in the storage device of the control node 11 include product images, product accompaniment images, scene images, scene processed images obtained by performing a processing process such as blurring on the scene images, the use histories and action histories of users, and a database for matching services in which these pieces of data are registered systematically.

Figure 2:
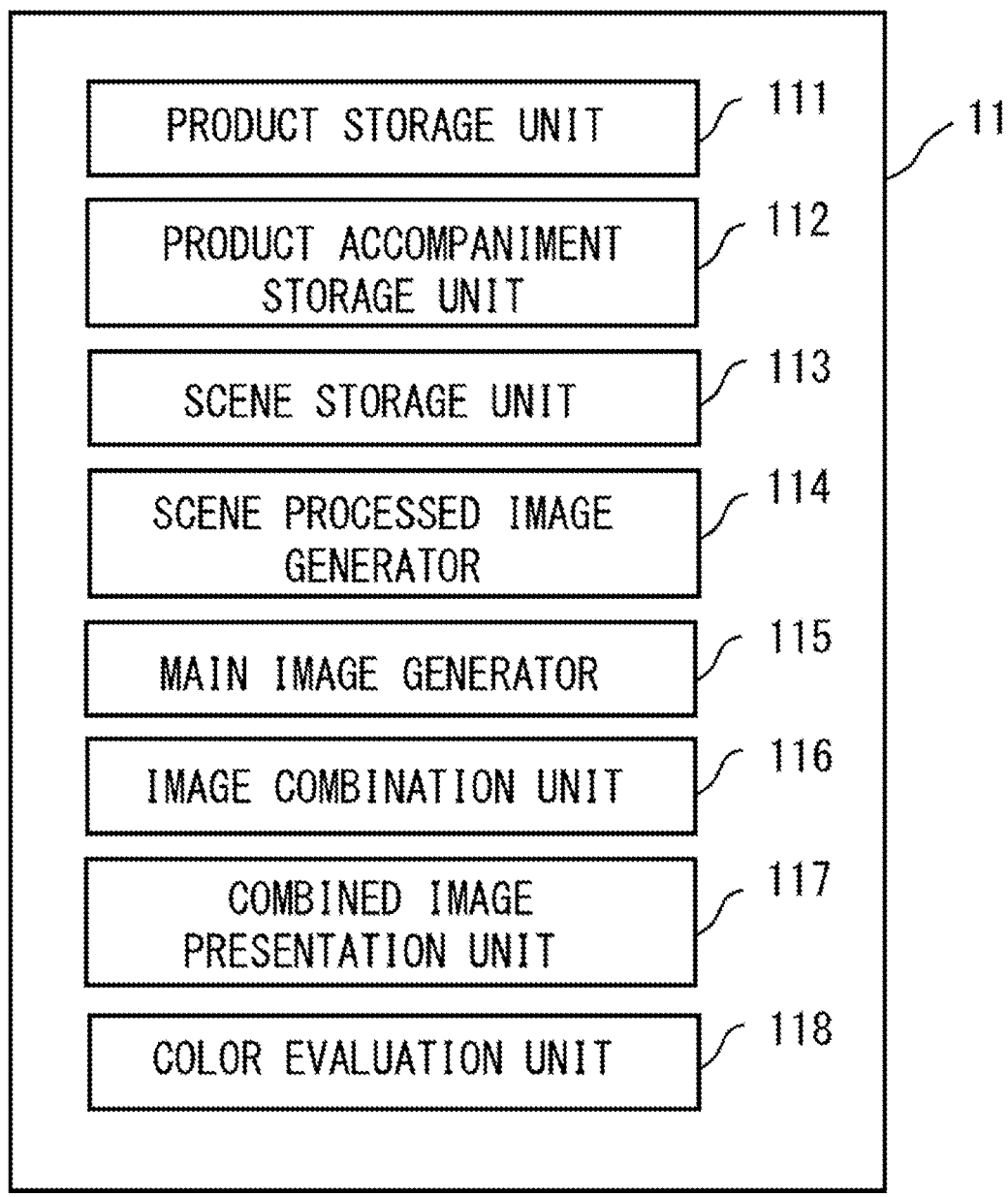
FIG. 2 is a diagram showing the functional elements of a control node of the combined image presentation system according to the embodiment.

Examples of the programs stored in the storage device of the control node 11 include a program for generating a main image representing a state in which a product is decorated with or displayed on a product accompaniment, a program for generating a scene processed image by processing a scene image, and a program for generating a combined image by combining a scene image or scene combined image as the background of a main image. When the CPU of the control node 11 performs processing in accordance with the software stored in the storage device, functional elements shown in FIG. 2 are implemented on the control node 11.

A product storage unit 111 is a database disposed in the storage device of the control node 11 and is storing images representing products. The "products" include all products including clothes as well as home appliances, furniture, and automobiles. The "clothes" include all clothes that users can wear, such as hats, glasses, masks, earphones, bags, rings, accessories, shoes, mufflers, scarfs, gloves, belts, and wallets.

A product accompaniment storage unit 112 is a database disposed in the storage device of the control node 11 and is storing images representing product accompaniments for decorating or displaying products. Specifically, if the "product" is "clothes," the "product accompaniment" is a "mannequin" that wears the clothes or "display furniture" on which the clothes are displayed. If the "product" is a "personal computer," the "product accompaniment" is a "cover" that covers the personal computer, a "seal" affixed to the personal computer, or the like. If the "product" is an "automobile," the "product accompaniment" is a "showroom" in which the automobile is displayed, a "garage" in which the automobile is stored, or the like.

A scene storage unit 113 is a database disposed in the storage device of the control node 11 and is storing scene images representing scenes. More specifically, the scene storage unit 113 is storing information previously registered by users as scene images, information arbitrarily inputted by users in the presentation process of the combined image presentation system 1, automatically read information, information retrieved from big data accumulated in other services, and the like. The "scenes" include all scenes related to the environment, humans, animals, plants, objects, interior, exterior, the inside and outside of buildings, nature, ballparks, football fields, mountain climbing, seas, and the like.

A scene processed image generator 114 generates a scene processed image by performing processing on a scene image stored in the scene storage unit 113 in accordance with specification of the user or a predetermined rule. For example, the scene processed image generator 114 generates a scene processed image by performing an abstraction process so that an area of a scene image specified by the user is blurred at an abstraction level specified by the user. Here, it is preferable to allow the user to specify the "abstraction level" such as 1, 2, . . . , or N (N is an integer) from the screen in steps. For example, assume that an image of the office of a state-of-the art IT company in Tokyo is used as a scene image. In this case, it becomes a security problem that various objects are clearly seen on this image. For this reason, the user may set the abstraction level to, for example, 3 so that the image is slightly abstracted and only the atmosphere is recognized.

Rather than performing the abstraction process on the entire scene image, the user may select an area to be subjected to the abstraction process in the scene image, for example, may set the abstraction level of only an area that is not desired to be shown clearly, to 2. If the scene image is an image of an office and the user wants to blur a logo, sign, object, or the like, the user may set the abstraction level of only such a portion to, for example, 4.

A main image generator 115 generates a main image representing a state in which a product is decorated with or displayed on a product accompaniment for decorating or displaying the product by combining a product image representing the product and a product accompaniment image representing the product accompaniment selected by the user.

Specifically, if the "product" is "clothes" and the "product accompaniment" is a "mannequin," the main image generator 115 generates an image representing a state in which the mannequin is wearing the clothes, as a main image. If the "product" is a "personal computer" and the "product accompaniment" is a "seal," the main image generator 115 generates an image representing a state in which the seal is affixed to the personal computer, as a main image. If the "product" is a "bicycle" and the "product accompaniment" is a "garage," the main image generator 115 generates an image representing a state in which the bicycle is placed in the garage, as a main image.

An image combination unit 116 generates a combined image by combining a scene image or scene processed image as the background of the main image. The scene image to be combined with the main image may be directly selected by the user. Or, the image combination unit 116 may determine a scene image matching the main image with a specified degree in accordance with preset AI or program and combine the determined scene image or a scene combined image obtained by processing the scene image using the scene processed image generator 114.

The "specified degree" with which the scene image matches the main image (hereafter referred to as "the matching degree") may be specified in a range of 0% to 100% on the screen by the user previously or during use of the combined image presentation system 1.

If a product is constantly used in a particular place, a matching degree of 100% may be specified. For example, if the product is workwear used in a particular plant, it is preferable to specify a matching degree of 100%. On the other hand, if the product is casual wear, it is preferable to specify a matching degree of, for example, 70% so that the casual wear matches any environment or scene to some extent. This is because the user wearing the casual wear is assumed to visit various places.

A matching degree of, for example, 0% or 10% may intentionally be specified so that the user can be conspicuous or enjoy the gap in an event, festival, or the like. A matching degree of, for example, 0% may be specified so that the user can use a product quite unsuitable for the use environment, for example, a coffee cup having a strange design.

If the user wants to combine not a scene image itself stored in the scene storage unit 113 but a scene combined image obtained by performing the abstraction process so the entire scene image or an area thereof is blurred, the user makes an instruction to that effect on the screen. Thus, the scene processed image generator 114 generates a scene processed image by performing the instructed processing on the scene image, and the image combination unit 116 generates a combined image in which the scene processed image is combined as the background of the main image.

Examples of the scene image selected by the user from the scene storage unit 113 or selected on the basis of the matching degree or the like in accordance with a program such as AI include the following.

(1) Scene Images Attributable to Clothes or Products (Clothes Concepts, Clothes Coordinate Concepts)

Information on development concepts, such as purposes or scenes that clothes or products match, obtained from product manufacturers or product planners is previously registered and is updated as necessary in accordance with the situation.

(2) Scene Images Attributable to Users (Past, Present, Future) (Actions, Preferences, Goals, Etc.)

Images representing the past action patterns/histories of users, the present actions thereof, and the scheduled and wished future actions thereof can be referred to. Not only images representing the time-series data but also images representing the constant action tendencies or preferences of the users can be referred to. Images representing the current goals or the like of the users can also be referred to.

(3) Scene Images Attributable to the Environment (Residence, Country, Region, Season, Temperature, Humidity, Wind Power, Rain, Hail, Snow, Morning/Daytime/Night Time Zone, Natural Light, the Light of Illumination or the Like, Animals, Plants, Etc.)

Images representing the current residences of the users or the places to which the users frequently go for business trips or travel, the places that the users are scheduled to visit, the current season, temperature, humidity, expected wind power, expected weather, and the like can also be referred to. Images representing scenes of morning, daytime, night, or the like that products may match can also be referred to. Images reproducing the predicted brightness of indoor illumination can also be referred to. With respect to outdoor scenes, images representing the latitude or climate of regions and images representing the angle or strength of natural light can also be referred to. Images representing animals or plants coexisting in the environment that products may match can also be referred to. Plants are important elements in the environment and therefore can influence matching.

(4) Scene Images Attributable to Purposes (Ease of Movement, Relaxing, Formality, Business, Stain Resistance, Rain Resistance, Water Resistance, Shock Resistance, Sports, Study, Dating, Marriage Hunting, Date, Corporate Entertainment, Parenting, Painting, Etc.)

A product to be selected varies between when the purpose of the user is relaxing and when it is business or formality. This applies to not only clothes but also products other than clothes. For example, when purchasing a hot water pot, a scene to be selected varies between when the hot water pot is used for relaxing purposes and when it is used for business purposes. For relaxing purposes, an image representing a spa famous as a tourist site may match the hot water pot with a high matching degree. For business purposes, an image representing a downtown office in which workers wearing a suit are briskly working may match the hot water pot with a high matching degree.

(5) Scene Images Attributable to Human Relations (Family Members, Friends, Coworkers, Nearby Persons in the Environment, Etc.)

Even when the same product is used in the same environment, the matching degree varies depending on with whom the user will use the product. For example, when purchasing "takoyaki" (octopus dumplings), the matching degree varies depending on in what environment and with whom the user will eat it. When eating takoyaki with elementary school students, a town in which many elementary school students are present may have a high matching degree. When eating takoyaki with overseas tourists, a tourist site in Osaka may have a high matching degree. When eating takoyaki with an important business client, a business setting may have a high matching degree. For this reason, data on human relations that are assumed or can be expected by the users serves as factors influencing the matching degree.

(6) Peal Backgrounds as Well as Category-Specific or Case-Specific Backgrounds Such as Art Style-Specific Backgrounds For example, category-specific images, such as ukiyoe-style, art print-style, and oil painting-style images, and specific artist-style images, such as Picasso-style, Osamu Tezuka-style, and Fujio Akatsuka-style images, can also be referred to. When processing scene images, the user may use a realistic image or an image obtained by abstracting a realistic image wholly or partially. As a quite different method, the user may combine a ukiyoe-style image rather than a reality-based image and determine whether the product matches the ukiyoe-style image. The combined image presentation system 1 may assist a user in purchasing a product by allowing the user to enjoy wondering whether the product matches a world view in a virtual space. For example, if a user wants to purchase a writing instrument that matches an art print-style world view in a virtual space, the combined image presentation system 1 allows the user to determine the degree with which a world view pursued by the user matches a combined virtual world and thus helps the user purchase the writing instrument. Even if digital data itself is a product, the combined image presentation system 1 allows the user to determine whether the digital data matches a scene representing a certain world view in a virtual space. For example, the combined image presentation system 1 allows the user to determine whether digital clothes match a certain world view or how the digital clothes match a game world, a movie world, a comic world, a painting world, or a real world and thus helps the user purchase the digital clothes.

A combined image presentation unit 117 presents the combined image generated by the image combination unit 116 to the user. Conceivable methods for presenting the combined image to the user include displaying it on the display of the user terminal 13, or displaying it on a large display installed in a real store, or presenting it using a technology such as VR, AR, or hologram.

A color evaluation unit 118 evaluates a color-related index between the product image, product accompaniment image, and scene image or scene processed image in the combined image presented by the combined image presentation unit 117.

Examples of the color-related index include a color wheel, brightness, and saturation. If a color wheel is used as the index, the index may be evaluated using various color schemes such as complementary colors or analogous colors. The color evaluation unit 118 makes an evaluation of the balance on all colors between the product image, product accompaniment image, and scene image or scene processed image on the basis of these indexes.

A color evaluation presentation unit 119 presents the evaluation made by the color evaluation unit 118 to the user. Conceivable presentation methods include displaying the evaluation on a display and outputting it as a speech. For example, an evaluation such as "the current product and the background have a complementary color relationship on a color wheel," "the current clothes have a color analogous to the atmosphere of a beach on a color wheel," or "the current background has this parameter value in brightness and saturation" is presented. This allows the user to determine whether the product image, product accompaniment image, and scene image or scene processed image match each other.

Figure 3:
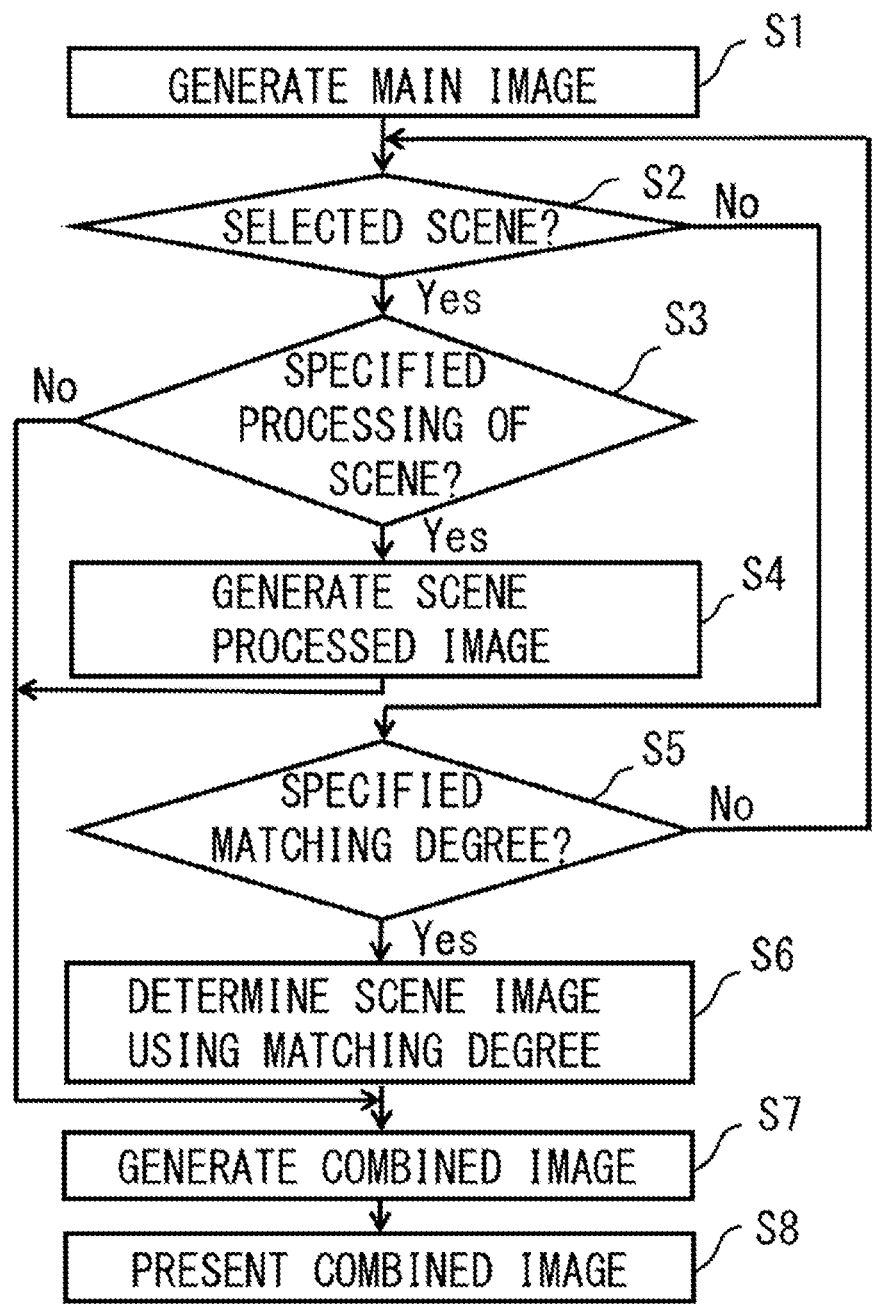
FIG. 3 is a flowchart showing process steps performed by the combined image presentation system according to the embodiment.

Next, referring to a flowchart shown in FIG. 3, process steps performed by the combined image presentation system 1 will be described. Here, it is assumed that a scene image is directly selected by the user or selected on the basis of the matching degree specified by the user.

First, the main image generator 115 of the control node 11 generates a main image by combining a product image and a product accompaniment image (step S1). Specifically, for example, if the "product" is "clothes" and the "product accompaniment" is a "mannequin," the user operates the user terminal 13 to select a mannequin close to the body shape of the user and clothes that the user is considering purchasing. Thus, the main image generator 115 reads an image of the clothes selected by the user from the product storage unit 111, reads an image of the mannequin selected by the user from the product accompaniment storage unit 112, and generates a main image representing a three-dimensional shape of a state in which the mannequin is wearing the clothes.

Then, if the user operates the user terminal 13 to select a scene image from among the scene images stored in the scene storage unit 113 (step S2: YES), and specifies some processing of the selected scene image (step S3: YES), the scene processed image generator 114 of the control node 11 generates a scene processed image by reading the selected scene image from the scene storage unit 113 and processing a portion specified by the user of the scene image into a specified appearance (step S4).

On the other hand, if the user has not selected any scene image (step S2: NO), the control node 11 determines whether the user has specified the matching degree (step 35). If the user has specified the matching degree (step S5: YES), the control node 11 determines, from among scene images stored in the scene storage unit 113, a scene image matching the main image generated in step S1 with the matching degree specified by the user (step S6). If the user has neither selected any scene image nor specified the matching degree (step S2: NO, step S5: NO), the process returns to step S2.

Then, the image combination unit 116 of the control node 11 generates a scene combined image by combining the scene image or scene processed image as the background of the main image (step S7). Specifically, if the user has specified a scene image and processing of the scene image, the image combination unit 116 combines the scene processed image generated in step S4 with the main image. If the user has specified a scene image but not specified processing of the scene image, the image combination unit 116 combines the scene image with the main image. If the user has not specified any scene image but specified the matching degree, the image combination unit 116 combines, with the main image, the scene image determined to match the main image with the matching degree specified by the user in step S6.

Then, the combined image presentation unit 117 of the control node 11 presents the combined image generated by the image combination unit 116 in step S7 to the user (step S8). Note that if the user has neither selected any scene image nor specified the matching degree, the main image alone may be presented to the user without combining a scene image with the main image.

As described above, the combined image presentation system 1 is able to combine the scene image or scene processed image as the background of the main image and to present the combined image to the user. Thus, the combined image presentation system 1 allows the user to check the scene in which the product may be used and helps the user purchase a product matching the use scene. For example, if the "product" is "clothes" and the "product accompaniment" is a "mannequin," the user is allowed to check whether the clothes become the user, whether the clothes match the use scene, or the like even if the user does not actually try on the clothes or does not actually experience the use scene while wearing the clothes. This helps the user purchase clothes.

The above embodiment is only illustrative, and the present invention can also be carried out by making various modifications to the embodiment without departing from the spirit and scope of the invention as set forth in the claims.

For example, the combination of the "product" and "product accompaniment" is not limited to that in the embodiment and may be any combination in all fields, including business transactions including rental and lease and private transactions. For example, if the "product" is an "electric fan" and a user attempts to purchase the electric fan, the combined image presentation system 1 allows the user to determine how the electric fan should be decorated or what scene matches the electric fan as a background. Also, if the "product" is an "automobile" and a user attempts to purchase the automobile, the combined image presentation system 1 allows the user to determine what scene matches a display as a background for showing the automobile well.

The processing process performed on the scene image is not limited to the abstraction process in which the scene image is blurred at the specified level and may be any other processing process such as a process of displaying a particular pattern or design on the image.

The communication scheme of the combined image presentation system 1 is not limited to the blockchain network 20 according to the above embodiment and may be, for example, pier-to-pier (P2P) or client-server communication, communication using a distributed storage blockchain, or a combination thereof.

While, in the above embodiment, the combined image presentation system 1 has been described as including the multiple nodes 10, the device configuration of the combined image presentation system 1 is not limiting. For example, the combined image presentation system 1 may consist of a single device or a client-server system. If the combined image presentation system 1 consists of a single device, this device may be a stand-alone device, which is not connected to a network such as the Internet.

What is claimed is:

1. A combined image presentation system comprising:
   a product storage unit that stores a product image representing a product;
   a product accompaniment storage unit that stores a product accompaniment image representing a product accompaniment for decorating or displaying the product;
   a scene storage unit that stores scene images representing scenes selectable by a user having an association to the product or user;
   a user controlled scene processed image generator that generates a scene processed image by performing processing on a scene image stored in the scene storage unit, the scene processed image generator configured to generate the scene processed image in accordance with an abstraction process whereby the user selects at least a partial area of the scene to be blurred at a user selected discrete visual abstraction level;
   a main image generator that generates a main image representing a state in which the product is decorated with or displayed on the product accompaniment by combining the product image and the product accompaniment image selected by the user;
   an image combination unit that generates a combined image by combining the scene processed image or the scene combined image as a background of the main image; and
   a combined image presentation unit that presents the combined image generated by the image combination unit to the user.

2. The combined image presentation system of claim 1, wherein the image combination unit determines a scene image matching the main image with a degree specified by the user and combines, as a background of the main image, the determined scene image or a scene processed image obtained by processing the scene image using the scene processed image generator.

3. The combined image presentation system of claim 1, further comprising:
   a color evaluation unit that makes an evaluation of a color-related index between the product image, the product accompaniment image, and the scene image or the scene processed image presented by the combined image presentation unit; and
   a color evaluation presentation unit that presents the evaluation made by the color evaluation unit to the user.

4. A computer program product for causing a computer to function as:
   a product storage means configured to store a product image representing a product;
   a product accompaniment storage means configured to store a product accompaniment image representing a product accompaniment for decorating or displaying the product;
   a scene storage means configured to store at least one scene image representing at least one scene selectable by a user having an association to the product or user;
   a user controlled scene processed image generation means configured to generate a scene processed image by performing processing on the at least one scene image stored in the scene storage means, the scene processed image generation means configured to generate the scene processed image in accordance with an abstraction process whereby the user selects at least a partial area of the scene to be blurred at a user selected discrete visual abstraction level;
   a main image generation means configured to generate a main image representing a state in which the product is decorated with or displayed on the product accompaniment by combining the product image and the product accompaniment image selected by the user;
   an image combination means configured to generate a combined image by combining the scene processed image or the scene combined image as a background of the main image; and a combined image presentation means configured to present the combined image generated by the image combination means to the user.

\* \* \* \* \*